United States Patent [19]

Nakashima et al.

[11] Patent Number: 5,673,392

[45] Date of Patent: Sep. 30, 1997

[54] METHOD OF EXECUTING COMMUNICATION PROGRAM IN MODEM APPARATUS

[75] Inventors: Tatsuya Nakashima, Yokosuka; Tomoyasu Shimizu, Sagamihara, both of Japan

[73] Assignee: Murata Mfg. Co., Ltd., Kyoto, Japan

[21] Appl. No.: 429,145

[22] Filed: Apr. 26, 1995

[30] Foreign Application Priority Data

Apr. 26, 1994 [JP] Japan .................................. 6-088661
Mar. 16, 1995 [JP] Japan .................................. 7-056877

[51] Int. Cl.$^6$ ...................................................... G06F 13/00
[52] U.S. Cl. ............................................................ 395/200.01
[58] Field of Search ............................................. 395/200.01

[56] References Cited

U.S. PATENT DOCUMENTS

| | | | |
|---|---|---|---|
| 4,805,208 | 2/1989 | Schwartz | 379/93 |
| 5,057,932 | 10/1991 | Lang | 358/335 |
| 5,212,774 | 5/1993 | Grider et al. | 395/200.01 |
| 5,260,693 | 11/1993 | Horsley | 341/67 |
| 5,333,063 | 7/1994 | Yoo | 358/448 |
| 5,384,780 | 1/1995 | Lomp et al. | 370/94.1 |
| 5,530,847 | 6/1996 | Schieve et al. | 395/183.14 |
| 5,563,592 | 10/1996 | Cliff et al. | 341/63 |

*Primary Examiner*—Ayaz R. Sheikh
*Attorney, Agent, or Firm*—Fish & Richardson P.C.

[57] ABSTRACT

A method of executing communication programs in a modem apparatus. A plurality of communication programs used to perform data communication or facsimile communication are stored in an internal memory space (e.g., ROM) in a processor after they have been compressed. A communication program to be executed in ROM is decompressed and developed in a work area external to the processor (e.g., RAM). The developed communication program is then executed by the processor. The data decompression is performed according to an exclusive program decompression program or a program in the communication programs which is adapted to provide a data decompression function.

14 Claims, 8 Drawing Sheets

METHOD OF EXECUTING COMMUNICATION PROGRAM IN MODEM APPARATUS

BACKGROUND OF THE INVENTION a) Field of the Invention

The present invention relates to a method of executing a communication program in a modem apparatus.

b) Description of the Prior Art

FIG. 10 shows a modem apparatus 200 constructed in accordance with the prior art. The modem apparatus 200 comprises a modem circuit 2 connected to a communication channel through an interface circuit 3. The modem circuit 2 is controlled by a central processing unit (CPU) 201.

The CPU 210 is responsive to a command from a data terminal equipment (DTE) connected to a data port D1, such as a personal computer, for executing a program in a read only memory (ROM) 205 or 211. One of these ROM's 205 is located outside of the CPU 201 and connected to a data port D2 in the CPU 201 while the other ROM 211 is included within the CPU 201. The CPU 201 uses a random access memory (RAM) 204 as a work area.

For further explaining the operational details of the CPU 201, it is now assumed herein that the modem apparatus 200 is an AT command modem. The AT command modem is well known as one that is compatible with Smart-modem, produced by the Hayes Company in U.S.A. For reducing the transmission error, it is customary that the AT command modem contains an error correction protocol following MNP (Microcom Networking Protocol) or the like. MNP is a protocol that has been proposed by the Microcom company in the U.S.A. and which has various effective functions such as datacompression/decompression and error correction.

The other protocol usable in the modem apparatus is LAPM (Link Access Procedure of Modems) taken by the recommendation V.42 of ITU-T (International Telecommunication Union-Telecommunication) which corresponds to the previous CCITT (Comité Consultatif International Télégraphique et Téléphonique). The recommendation V.42 of ITU-T also takes MNP classes 2–4 in addition to LAPM.

If the modem apparatus 200 is in the form of an AT command modem, it can utilize both V.42 protocol (which will be used relating to LAPM) and MNP protocol. At the same time, the modem apparatus 200 can have a function of executing facsimile (FAX) communication.

In the modem apparatus 200 having these functions, ROM's 205 and 211 are used in such a form as shown in FIG. 11. In this figure, ROM 211 includes a basic program 51 for providing the basic function of an AT command modem. As shown in FIG. 12, when power is applied, the CPU 201 first executes the basic program 51 for causing the modem apparatus 200 to start up (300). Thus, the CPU 201 itself is placed in a state in which it can receive AT commands from a DTE.

When the CPU 201 receives an AT command from a DTE through the port D1 (301), it executes the basic program 51 to analyze this AT command (302). If the CPU 201 judges that the AT command commands any one of the communication modes incorporated into the modem apparatus 200, the CPU 201 executes a program relating to the commanded communication mode (303–306).

For example, if the commanded communication mode is V.42 protocol communication mode (303), the CPU 201 executes data compression/decompression and error correction programs 52, 53 for V.42 (specifically, V.42 bis) protocol, which have been stored in ROM 211 (304). More particularly, the CPU 201 executes the data compression/decompression program 52 to compress the communication data before they are fed out to the communication channel and to decompress the communication data after they are received by the modem apparatus 200 from the communication channel, according to the V.42 bis protocol. Further, the CPU 201 executes the error correction program 53 to correct any errors contained in the received communication data, according to the V.42 bis protocol.

If the commanded communication mode is MNP (303), the CPU 201 executes data compression/decompression and error correction programs 54, 55 for MNP, which have been stored in ROM 211 (305). More particularly, the CPU 201 executes the data compression/decompression program 54 to compress the communication data before they are fed out to the communication channel and to decompress the communication data after they are received by the modem apparatus 200 from the communication channel, according to MNP. Further, the CPU 201 executes the error correction program 55 to correct any errors contained in the received communication data, according to MNP.

If the commanded communication mode is FAX (303), the CPU 201 reads out and executes a FAX program 56 stored in ROM 205 (306). More particularly, the CPU 201 executes the FAX program 56 to convert data supplied from a DTE through the port D1 into communication data before they are fed to the communication channel and also to convert communication data from the communication channel into data which can be received by a DTE.

When these programs are to be executed, RAM 204 is used as an area for temporarily storing the communication data. In this case, the basic program 51 is executed by the CPU 201 to provide various other functions such as dialing, transmission control, reception control and so For example, if a DTE commands FAX mode, the CPU 201 converts data from the DTE through the port D1 into FAX communication data according to the FAX program 56 and also causes the converted FAX communication data to be temporarily stored on RAM 204 through the port D2. The CPU 201 then executes the dialing according to the basic program 51 and transfers the FAX communication data from RAM 204 to the modem circuit 2. The modem circuit 2 modulates the FAX communication data to form signals which are in turn fed to the communication channel through the interface circuit 3 according to the basic program 51. On the contrary, the CPU 201 demodulates signals from the communication channel through the interface circuit 3 into FAX communication data through the modem circuit 2, according to the basic program 51. CPU 201 causes the demodulated FAX communication data to be temporarily stored in RAM 204, according to the basic program 51. Thereafter, the CPU 201 reads the FAX communication data out of RAM 204 through the port D2 and further converts them into FAX data, according to the FAX program 56. The FAX data are then supplied to DTE through the port D1.

The size of each of the programs 51–56 is smaller than 15 KB. To accomplish the modem apparatus 200 having the aforementioned functions, it may only provide a memory space totally equal to or larger than 90 KB. In the prior art shown by FIGS. 10 and 11, 75 KB is provided by ROM 211 in the CPU 201 while the remaining memory space, 15 KB, is provided by the external ROM 205.

One of the reasons for providing the memory space in such a form is that the storage area which can be included in the CPU 201 is limited in its physical size. In other words, the manufacturing cost greatly increases for the CPU 201 to contain such a large-scale memory space totally equal to or larger than 90 KB. To overcome such a problem, the memory space in the CPU 201 must be limited in size. Due to such a physical limitation, the prior art of FIGS. 10 and 11 had to store one of the necessary programs (specifically, FAX program 56) in the external ROM 205 of the CPU 201. Use of the external ROM 205 leads to the increased size of the modem apparatus 200.

SUMMARY OF THE INVENTION

A first object of the present invention is to select and execute any one of many communication programs without provision of a large-scale memory space in a processing circuit (being generally in the form of a CPU) for executing the communication programs.

A second object of the present invention is to eliminate the need of an external storage cell (e.g., ROM) for storing a number of communication programs by causing a processing circuit (being generally the CPU) to store all the communication programs.

A third object of the present invention is to provide an inexpensive and small-sized modem apparatus through accomplishment of the first and second objects.

The present invention provides a method of executing programs through a processor, comprising a step of storing a program decompression program and a first program in a processor, for example, in the internal memory space of a processor provided by a built-in ROM.

The first program is a program for defining the operation of the processor (e.g., a program based on ITU-T recommendation V.42 bis or MNP). A plurality of such first programs can be incorporated into the processor. When the first program is to be stored in the processor, it has been previously compressed by a given data compression algorithm (which will be called a "first data compression algorithm").

The program decompression program stored in the processor with the first program is one representing a given data decompression algorithm which will be called a "first data decompression algorithm". A complementarity (reciprocality) exists between the first data decompression algorithm and the first data compression algorithm. More particularly, data compressed according to the first data compression algorithm can be restored into its original form by decompressing the compressed data according to the first data decompression algorithm. The program decompression program is stored in the processor such that it can be immediately executed.

The first program stored in the processor cannot be directly executed since it is in the form of compressed data. If one of the first programs specified as by a command from DTE is to be executed, that first program is first decompressed by the program decompression program. Thus, the first program in question is immediately converted into executable data by the processor. The converted first program is temporalily developed in the work area of the processor (e.g., RAM) and then executed by the processor.

The present invention does not require a program storing ROM outside the processor on one hand and can reduce the internal memory space of the processor on the other hand, because almost all the programs executed by the processor have been previously compressed. This can reduce both the size and manufacturing cost of the modem apparatus.

Among the programs executed by the processor, only the program decompression program must be stored such that it can be immediately executed. It is of course possible that some of the first programs may be stored such that they can be immediately executed by the processor. To provide the advantages of the present invention more effectively, however, the number of first programs stored in such a form may be limited.

The program decompression program may be in the form of a program diverted from or functionally added to a program used for decompressing data (e.g., a communication data decompression program representing a data decompression algorithm defined by ITU-T recommendation V.42 bis or MNP) or in the form of a program exclusively for decompressing the first programs. Particularly, the former provides an advantage in that no new program is required. The latter provides an advantage in that the internal memory space of the processor can be further reduced since the data decompression program, among the first programs, can be compressed. Since the size of the program decompression program is usually much smaller than that of the communication program or the like, the memory space occupied by the program decompression program becomes smaller than the empty memory space formed by data compressing the first programs. Therefore, the addition of the program decompression program in the latter form will not prevent the saving of the memory space.

Furthermore, both the forms may be combined. For example, the data decompression program may be decompressed by an exclusive program decompression program while any other program may be decompressed by the decompressed data decompression program.

Another program which may be stored such that it can be immediately executed by the processor is a basic program required to start the modem apparatus. Even if the basic program itself has been compressed and stored, however, the modem apparatus can be started when the program decompression program is executed prior to execution of the basic program. It is not necessary to store the basic program such that it can be immediately executed by the processor.

DETAILED DESCRIPTION OF THE PREFERRED EMBODIMENTS

Figure 10:
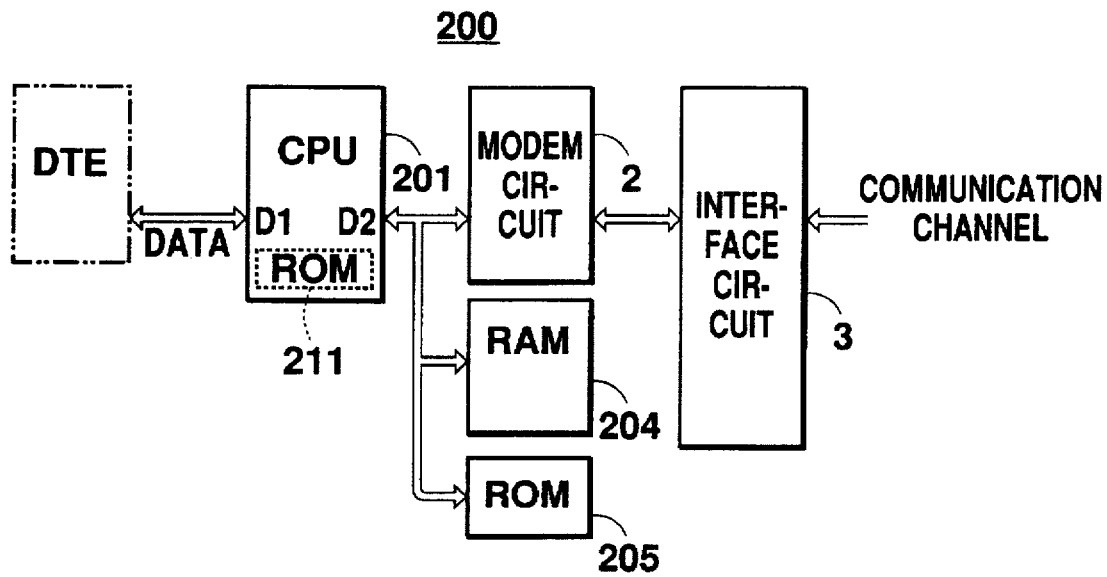
FIG. 10 is a block diagram illustrating the hardware layout of a modem apparatus constructed in accordance to the prior art.
Figure 11:
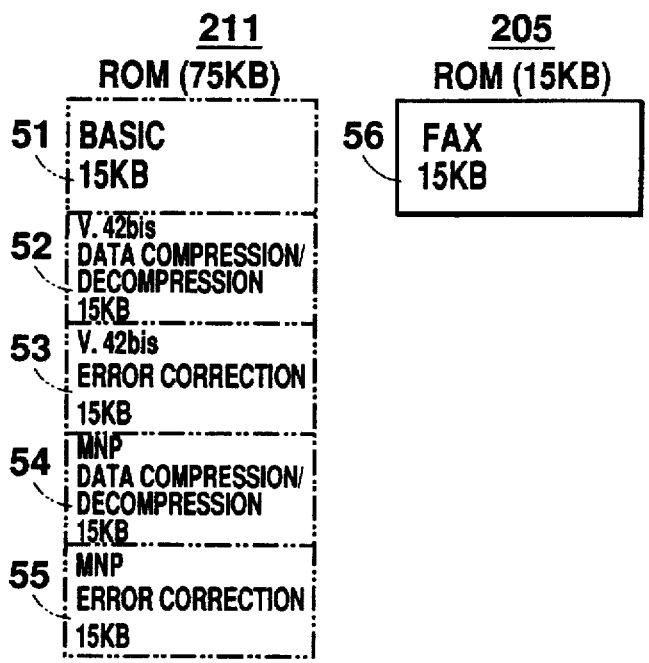
FIG. 11 is a memory space map illustrating program storage in the modem apparatus of the prior art.
Figure 12:
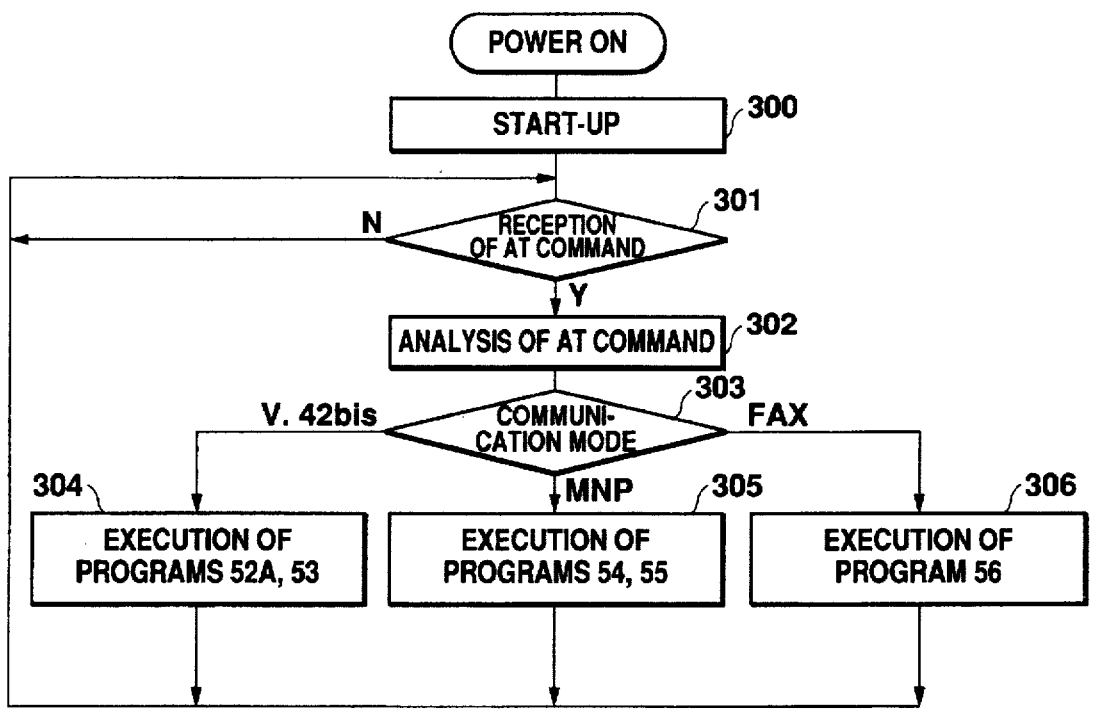
FIG. 12 is a flowchart illustrating the general flow of communication mode selection in the modem apparatus of the prior art.

Some preferred embodiments of the present invention will now be described with reference to the drawings in which parts similar to those of the prior art shown in FIGS. 10 and 11 are designated by similar reference numerals and will not be further described.

a) Hardware

Figure 1:
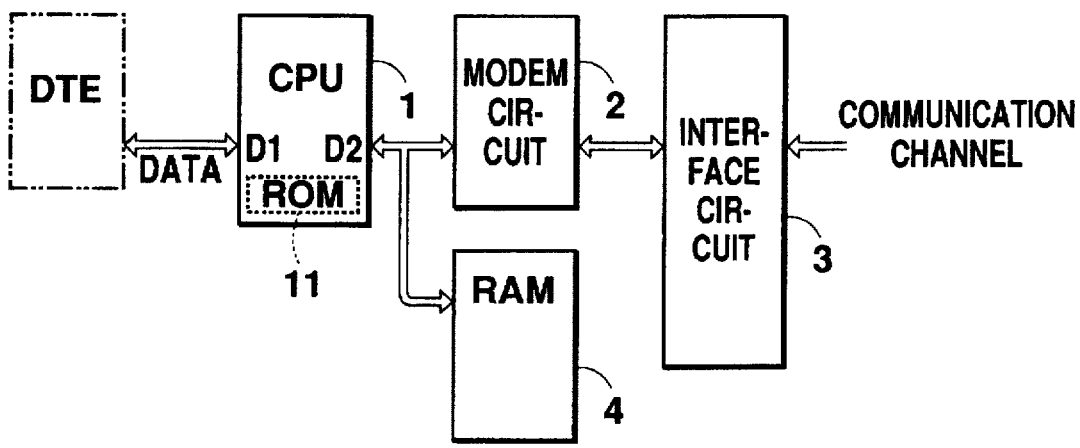
FIG. 1 is a block diagram showing the hardware layout of a modem apparatus suitable for use in the present invention.

FIG. 1 shows a modem apparatus 100 suitable for use in the present invention. In the modem apparatus 100, the external ROM 205 used in the prior art is omitted. The CPU and associated ROM and RAM are respectively denoted by reference numerals 1, 11 and 4 since they are different in function from the CPU 201, ROM 211 and RAM 204 in the prior art. The modem apparatus 100 according to the present invention can also execute communications based on V.42 bis protocol and MNP and FAX communication, as in the prior art of FIG. 11.

b) First Embodiment

Figure 2:
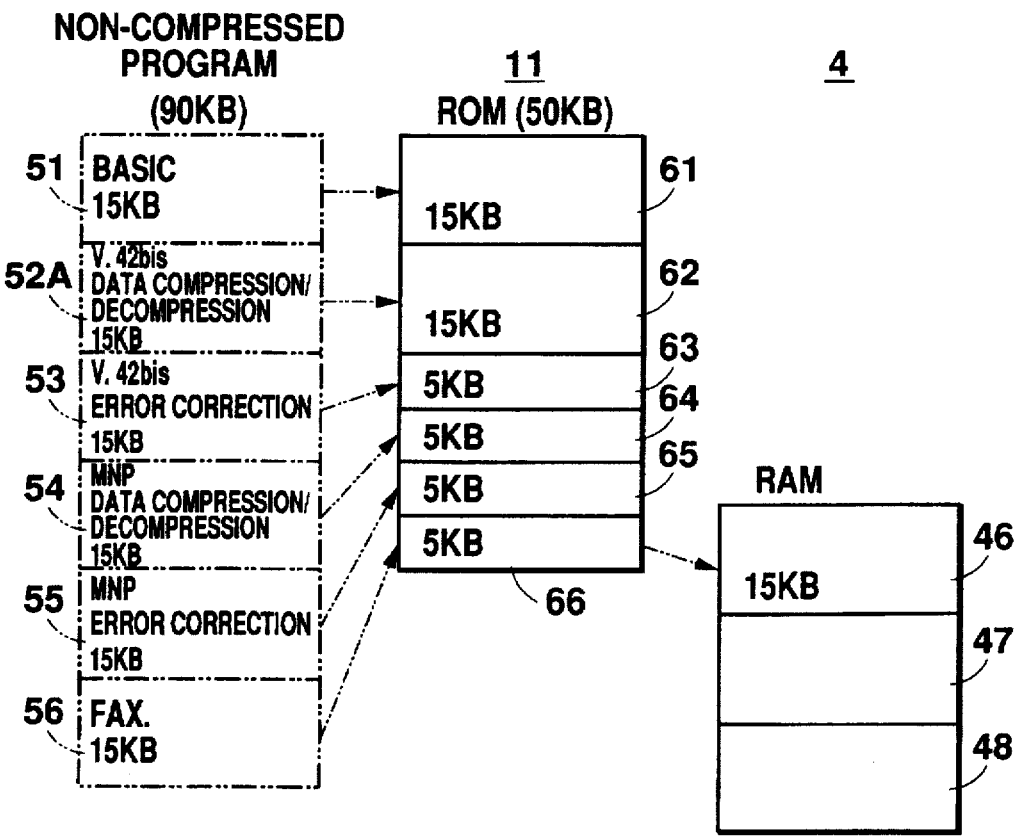
FIGS. 2, 4, 6 and 8 are memory space maps illustrating program compression/decompression and program storage in first to fourth embodiments of the present invention.

FIG. 2 schematically shows a form of program storage in the first embodiment of the present invention and a program compression/decompression executed by the first embodiment. The first embodiment also utilizes the basic program 51 for start-up, AT command analysis (communication mode selection), dialing, transmission control, reception control and so on, the data compression/decompression and error correction programs 52, 53 for performing the communication based on V.42 bis protocol, the data compression/ decompression and error correction programs 54, 55 for performing the communication based on MNP and the FAX program 56 for carrying out FAX communication.

One of the features of the first embodiment is that these programs 51–56 are incorporated into the modem apparatus 100 after the programs 53–56 have been compressed to one-third. Therefore, the total size of the incorporated programs 51–56 is at most equal to 50 KB (=15+15+5+5+5+5).

Another feature of the first embodiment is that all the programs 51–56 have been stored in the ROM 11 included in CPU 1 and that the external ROM is then omitted. This is because the total size of the incorporated programs 51–56 is at most equal to 50 KB and the ROM 11 in the CPU 1 can solely provide memory spaces 61–66 usable for storing the programs 51–56. In other words, no external ROM is required. Since the size of the ROM 11 may be smaller than that of the prior art shown in FIG. 11, the CPU 1 may be inexpensively manufactured. Reference numerals 61–66 indicate storage areas for storing the programs 51–56 provided by the ROM 11, respectively.

Still another feature of the first embodiment is that when each of the programs 53–56 is to be executed, it is decompressed by using a data compression/decompression program 52A based on V.42 bis protocol. Therefore, the communications based on V.42 bis protocol and MNP and FAX communication can be desirably executed without any disadvantage as in the prior art, regardless of the fact that the programs 53–56 have been compressed and stored. In the first embodiment, the data compression/decompression program based on V.42 bis protocol is denoted by 52A to distinguish it from the data compression/decompression program 52 of the prior art which was exclusively used for data compression/decompression.

Figure 3:
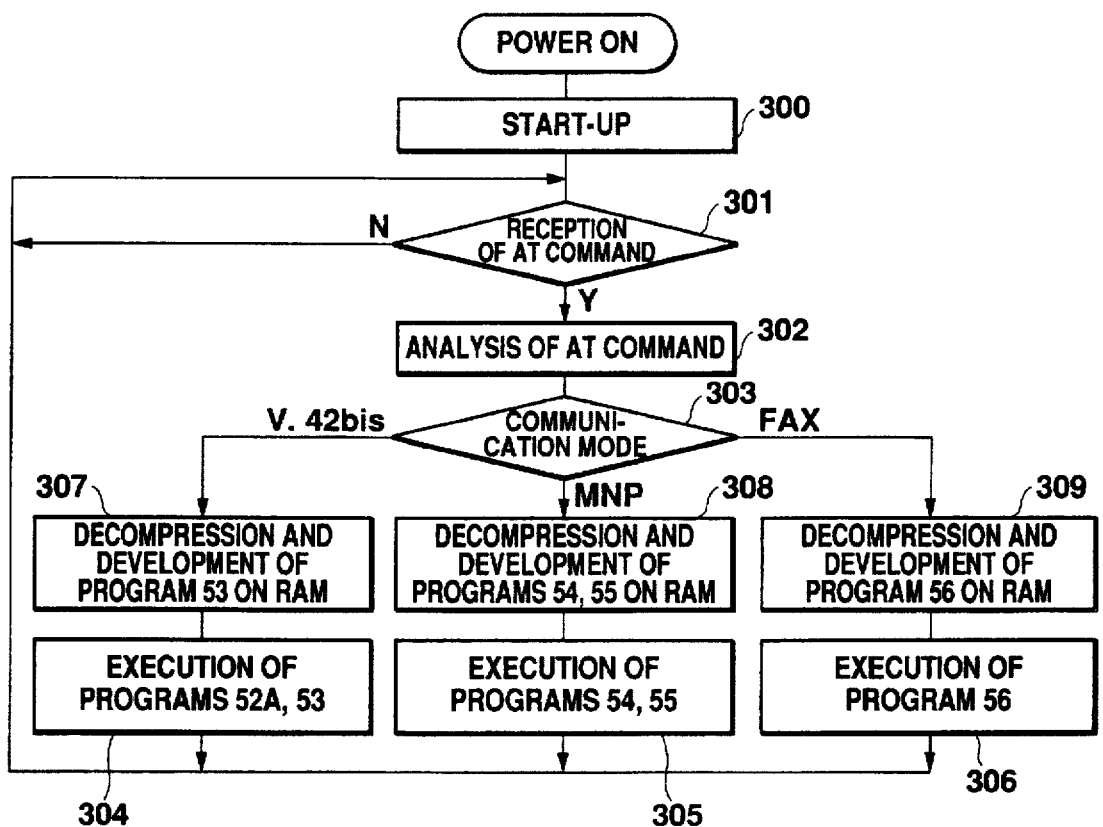
FIGS. 3, 5, 7 and 9 are flowcharts illustrating the general flows of communication mode selection in the first to fourth embodiments of the present invention.

FIG. 3 shows the operational procedure of the first embodiment. As shown, the CPU 1 first executes steps 300–303 as in the prior art. The CPU 1 executes a program relating to a commanded communication mode (304–306). At this time, the CPU 1 can directly execute a non-compressed program (i.e., immediately executable program) stored in ROM 11. On the contrary, a compressed program (i.e., after-decompression executable program) stored in ROM 11 is decompressed and developed in RAM 4 by the V.42 his protocol based data compression/decompression program 52A before being executed by the CPU 1.

For example, if the commanded communication mode is V.42 bis protocol communication mode (303), the CPU 1 will not decompress the data compression/decompression program 52A since it is not compressed. Since another program to be executed, that is, the error correction program 53 is compressed, however, the CPU 1 decompresses the program 53 by executing the data compression/ decompression program 52A. The decompressed program 53 may be transferred to and stored in one of the storage areas 46–48 in RAM 4 (e.g., the storage area 46 having a size of 15 KB) (307). Thereafter, the CPU 1 executes the data compression/decompression program 52A and error correction program 53 for communication data (304).

If the commanded communication mode is MNP communication mode (303), the CPU 1 decompresses the programs 54 and 55 to be executed by executing the data compression/decompression program 52A, since these programs 54 and 55 have been compressed. The decompressed programs 54 and 55 are then transferred to and stored in one or two of the storage areas 46–48 on RAM 4 (e.g., the storage areas 46 and 47 each having 15 KB) (308). Thereafter, the CPU 1 executes the data compression/ decompression program 54 and error correction program 55 for communication data (305).

If the commanded communication mode is FAX communication mode (303), the CPU 1 decompresses the FAX program 56 to be executed by executing the data compression/decompression program 52A, since the FAX program 56 has been compressed. As shown in FIG. 2, the decompressed program 56 is then transferred to and stored in one of the storage areas 46–48 in RAM 4 (e.g., the storage area 46) (309). Thereafter, the CPU 1 executes the FAX program 56 for communication data (306).

As these programs are executed for communication data, the CPU 1 executes the dialing, transmission control, reception control and so on according to the basic program 51 while using any storage area of the storage areas 46–48 on RAM 4 which is not used to store the programs 53–56, as a temporary storage area for communication data.

Thus, the first embodiment can make a modem apparatus more inexpensive than the prior art since the external ROM can be omitted by storing all the programs 51–56 in ROM 11 after they have been compressed. This can further prevent the size of the ROM 11 from being increased, without increase of the manufacturing cost of the CPU 1. Since the compressed and stored programs 53–56 are decompressed by the data compression/decompression program 52A before they are to be used, the communications based on V.42 bis protocol and MNP and FAX communication can be executed without any obstruction, as in the prior art. Since the programs used to decompress the compressed and stored programs 53–56 is the data compression/decompression program based on V.42 bis protocol, no newly prepared program is required to decompress the programs 53–56. Since the memory space size of the RAM 4 used as the work area for the CPU 1 is normally expected to have some room, no problem will be raised even if the decompressed programs 53–56 are developed in RAM 4. In addition, a new communication program may be stored in ROM 11 since the storage section of the ROM 11 occupied by the programs is desirably smaller than the prior art.

c) Second Embodiment

Figure 4:
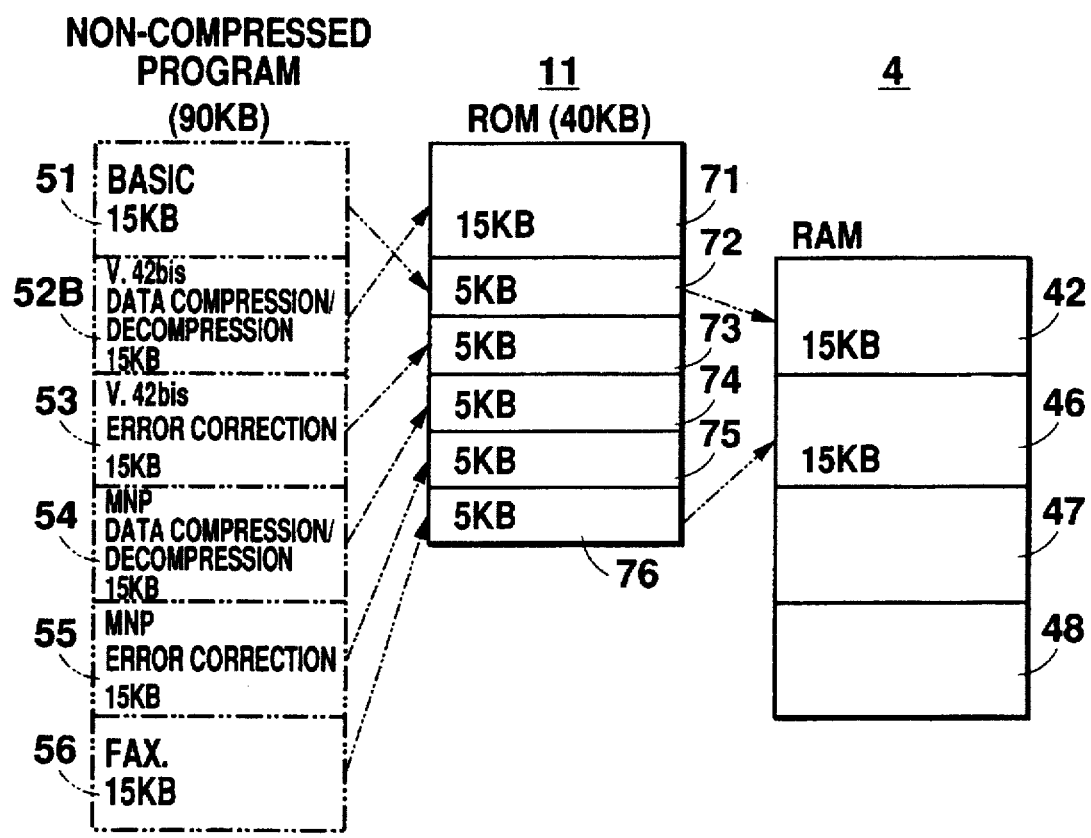

FIG. 4 schematically shows a form of program storage in the second embodiment of the present invention and a program compression/decompression executed by the second embodiment. The second embodiment is different from the first embodiment in that in addition to the programs 53–56, the basic program 51 is also compressed and stored at one-third the size. As a result, the memory space size required to store the programs 51–56 is at most equal to 40 KB (=5+15+5+5+5+5). Thus, the storage capacity of ROM 11 may be reduced more than the first embodiment, leading to reduction of the manufacturing cost in the modem apparatus. The second difference between the second and first embodiments is that the second embodiment uses a data compression/decompression program 52B based on V.42 bis protocol to decompress the basic program 51. This will change the start-up procedure.

In FIG. 4, reference numerals 71–76 denote storage areas provided by ROM 11 and used to store the programs 51–56. Each of the storage areas has a size of 5 KB, except that the storage area 71 for storing the data compression/decompression program 52B based on V.42 bis protocol has a size of 15 KB. The data compression/decompression program based on V.42 bis protocol is denoted by 52B since it is distinguished from that of the first embodiment by also using this data compression/decompression program to decompress the basic program 51. Reference numerals 42 and 46–48 designate storage areas in RAM 4.

Figure 5:
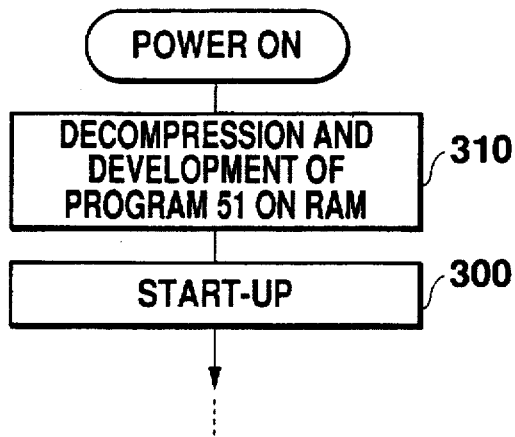

FIG. 5 shows the operational procedure of the second embodiment. As shown, the CPU 1 decompresses the compressed and stored basic program 51 by executing the data compression/decompression program 52B based on V.42 bis protocol. The decompressed basic program 51 is then transferred to and stored in one of the storage areas 42–48 on RAM 4 (e.g., the storage area 42 having a size of 15 KB) (310). Thereafter, the CPU 1 executes steps 300–309, as in the first embodiment. It is evident that in addition to the program 53, the program executed at the step 304 is 52B rather than 52A.

In addition to all the advantages provided by the first embodiment, the second embodiment provides a new advantage in that the modem apparatus 100 can be more inexpensively manufactured since the size of the ROM 11 becomes smaller than that of the first embodiment.

d) Third Embodiment

Figure 6:
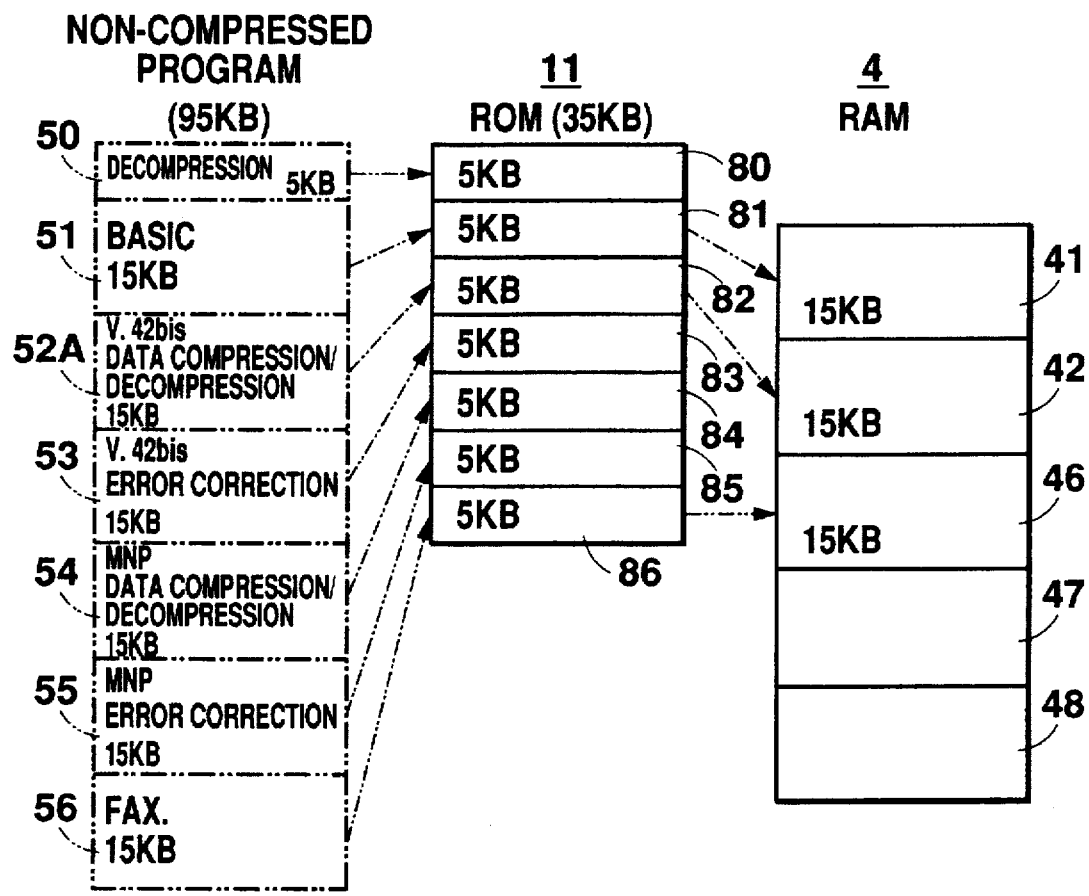

FIG. 6 schematically shows a form of program storage in the third embodiment of the present invention and a program compression/decompression executed by the third embodiment. The first difference between the third and second embodiments is that the third embodiment compresses all the programs 51–56 to one-third. As a result, the memory space size required to store the programs 51–56 is at most equal to 30 KB (=5+5+5+5+5+5). The second difference between the third and second embodiment is that a data decompression program 50 is used to decompress the basic program 51 as well as the V.42 bis protocol based data compression/decompression program 52A before they are executed. Thus, the data compression/decompression program 52A can also be compressed and stored in the modem apparatus 100. Since the data decompression program 50 is at most 5 KB, the memory size of the ROM 11 required to store the program 50 in addition to the other programs will not exceed 35 KB at most. According to the third embodiment, therefore, the size of the ROM 11 can be reduced smaller than the second embodiment. In FIG. 6, reference numerals 80–86 designate storage areas for storing the programs 50–56 provided by ROM 11, each of these storage areas having a size of 5 KB. The V.42 bis protocol based data compression/decompression program is indicated by 52A since it is common to that of the first embodiment in that the data compression/decompression program 52A is not used to decompress the basic program 51, but to decompress the programs 53–56. Reference numerals 41, 42 and 46–48 denote storage areas in RAM 4.

Figure 7:
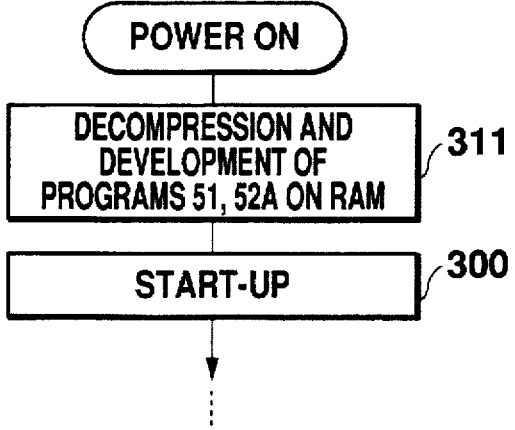

FIG. 7 shows the operational procedure of the third embodiment. As shown, the CPU 1 first executes the data decompression program 50 to decompress the basic program 51 and V.42 bis protocol based data compression/decompression program 52A which have been compressed and stored. The decompressed programs 51, 52A are then transferred to and stored in two of the storage areas 41, 42 and 46–48 (e.g., the storage areas 41, 42 of the 15 KB in RAM 4) (311). Thereafter, the CPU 1 executes steps 300–309, as in the second embodiment. It is evident that in addition to the program 53, the program executed at the step 304 is 52A rather than 52B.

In addition to all the advantages provided by the first and second embodiments, the third embodiment provides a new advantage in that the modem apparatus 100 can be more inexpensively manufactured since the size of the ROM 11 becomes smaller than that of the second embodiment. Furthermore, the data decompression program 50 may have an additional set-up function.

e) Fourth Embodiment

Figure 8:
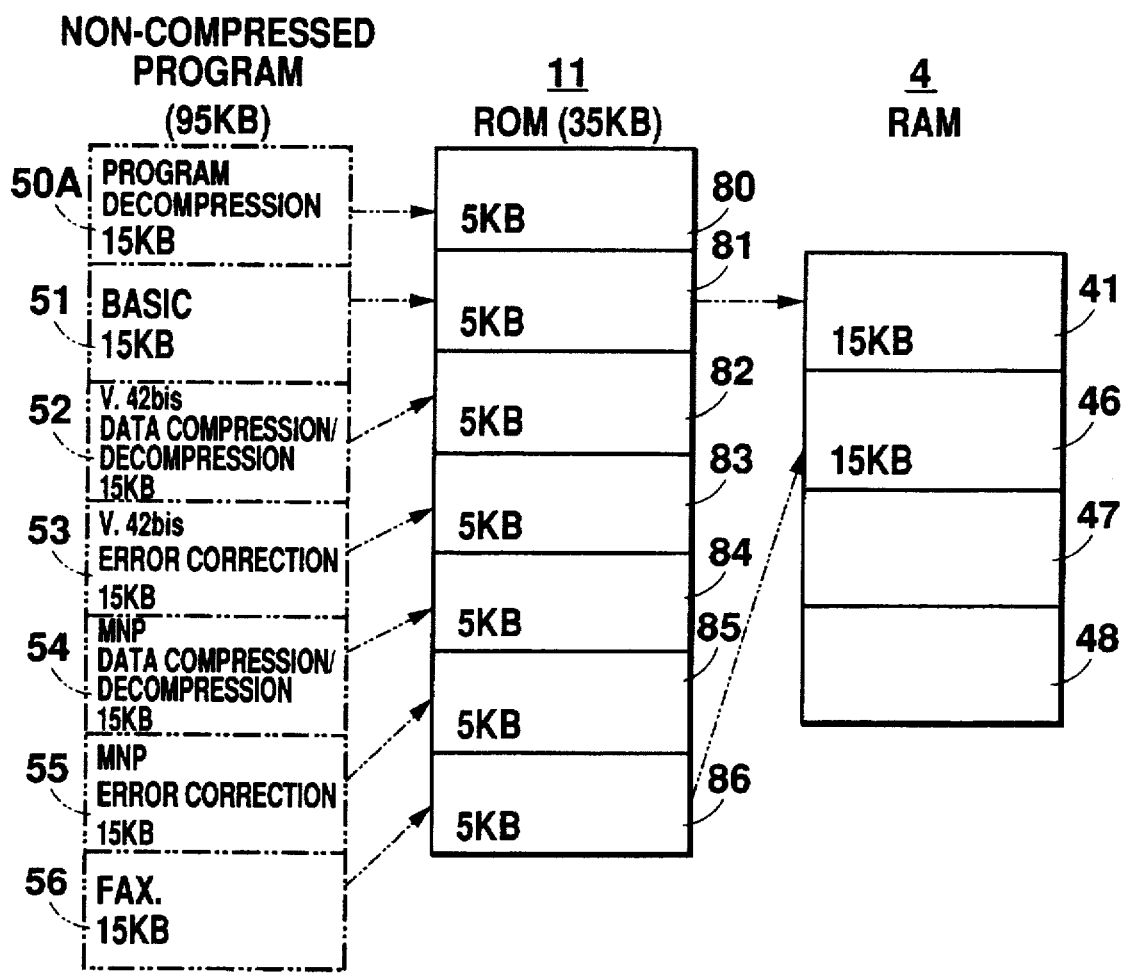

FIG. 8 schematically shows a form of program storage in the fourth embodiment of the present invention and a program compression/decompression executed by the fourth embodiment. As in the third embodiment, the fourth embodiment compresses all the programs 51–56 to one-third and also uses a data decompression program 50A. The first difference between the fourth and third embodiments is that the data decompression program 50A used in the fourth embodiment is different from the data decompression program 50 of the third embodiment in that it is used to decompress all the programs 51–56. The V.42 bis protocol based data compression/decompression program is indicated by the same reference numeral 52 as in the prior art since it is common to the prior art in that the data compression/decompression program 52 is not used to decompress all the programs. Reference numerals 41 and 46–48 denote storage areas in RAM 4.

Figure 9:
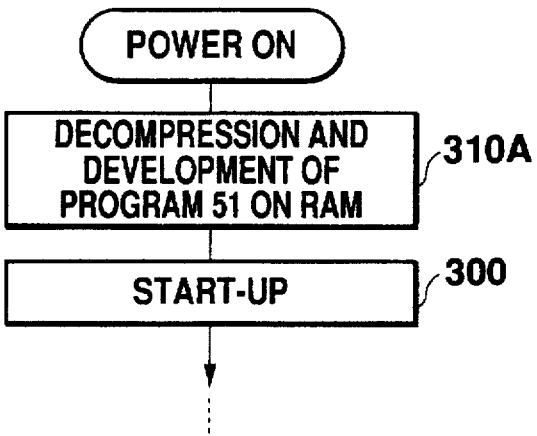

FIG. 9 shows the operational procedure of the fourth embodiment. As shown, CPU 1 first executes the data decompression program 50A to decompress the basic program 51 which has been compressed and stored. The decompressed program 51 is then transferred to and stored in one of the storage areas 41 and 46–48 in RAM 4 (e.g., the storage areas 41 of 15 KB) (310A). Thereafter, the CPU 1 executes steps 300–309, as in the third embodiment. However, the program used at steps 307–309 to decompress the programs is the data decompression program 50A. It is evident that in addition to the program 53, the program executed at the step 304 is 52 rather than 52A.

Therefore, the fourth embodiment can provide all the advantages provided by the third embodiment.

f) Supplement

Although all the embodiments have been described with regard to application to the system shown in FIG. 1, the present invention is not limited to such an application. It is apparent for a person skilled in the art that the system layout shown in FIG. 1 may be modified or changed without departing from the scope of the invention. Although the embodiments of the present invention have been applied to V.42 his protocol or MNP, the present invention is not limited to such protocols. Although the embodiments of the present invention have been described as to use of the V.42 bis protocol based data compression/decompression program or exclusive program decompression program, the present invention may utilize a data compression/decompression program based on MNP.

We claim:

1. A method of executing programs in a modem apparatus that includes a random access memory work area and a first processor configured to respond to commands from a data terminal equipment containing a second processor, the method comprising:

a first step of storing in the first processor: (a) a program decompression program executable immediately by the first processor and representing a data decompression algorithm and (b) a first program defining the operation of the first processor and compressed previously according to a data compression algorithm reciprocal to said data decompression algorithm;

a second step of decompressing the first program by executing said program decompression program with said first processor of said modem apparatus to convert said first program into a form immediately executable by the first processor;

a third step of storing said first program in the random access memory work area of the first processor after the second step has been executed; and a fourth step of executing the first program stored in the random access memory work area with said first processor of said modem apparatus.

2. A method as defined in claim 1 wherein the first step further includes a step of storing a second program belonging to said programs and being different from said first program in said processor while being compressed according to said data compression algorithm and wherein said processor executes the second through fourth steps for one of said first and second programs.

3. A method as defined in claim 1 wherein said first program is a data decompression program representing a second data decompression algorithm different from said data decompression algorithm and wherein the first step further includes a step of storing a second program belonging to said programs and being different from said first program in said processor while being compressed according to a second data compression algorithm reciprocal to said second data decompression algorithm, said method further comprising:

a fifth step of executing said fourth step to convert said second program into a form immediately executable by said processor;

a sixth step of developing said second program in said work area after the fifth step has been executed; and a seventh step of executing the second program developed in the work area.

4. A method as defined in claim 1 wherein the first step further includes a step of storing, in said processor, a second program belonging to said programs and defining the operation of said processor, said second program stored in a form immediately executable by said processor and the method further comprising a fifth step of executing said second program through said processor.

5. A method of executing programs in a modem apparatus that includes a communication channel, a modem circuit, a first processor configured to execute a first communication program and to respond to commands from a data terminal equipment containing a second processor, an internal memory space in the first processor configured to store the first communication program, and a random access memory work area, the method comprising:

a first step of storing in said memory space: (a) a program decompression program representing a first data decompression algorithm and immediately executable by the first processor, (b) programs defining the operation of the first processor, and (c) the first communication program compressed according to a first data compression algorithm reciprocal to said first data decompression algorithm;

a second step of executing said program decompression program using the first processor to convert said first communication program into a form immediately executable by the first processor in response to a command from the data terminal equipment;

a third step of storing said first communication program in said random access memory work area after the second step has been executed; and a fourth step of causing the first processor to execute the first communication program stored in the random access memory work area.

6. A method as defined in claim 5 wherein the first step further includes a step of storing a second communication program belonging to said programs and being different from said first communication program in said memory space while being compressed according to said first data compression algorithm and wherein said processor executes the second through fourth steps for one of said first and second communication programs which is specified by a command from said data terminal equipment.

7. A method as defined in claim 5 wherein said first communication program is a data decompression program representing a second data decompression algorithm different from said first data decompression algorithm and wherein the first step further includes a step of storing a second communication program belonging to said programs and being different from said first communication program in said memory space while being compressed according to a second data compression algorithm reciprocal to said second data decompression algorithm, said method further comprising:

a fifth step of executing said fourth step to convert said second communication program into a form immediately executable by said processor;

a sixth step of developing said second communication program in said work area after the fifth step has been executed; and a seventh step of executing the second communication program developed in the work area.

8. A method as defined in claim 5 wherein the first step further includes a step of storing, in said memory space, a second communication program belonging to said programs and defining the operation of said processor, said second communication program stored in a form immediately executable by said processor and the method further comprising a fifth step of executing said second communication program through said processor.

9. A method as defined in claim 8 wherein said second communication program is a program for starting said modem apparatus.

10. A method as defined in claim 8 wherein said second communication program is a program for causing said processor to execute said program decompression program.

11. A method as defined in claim 5 wherein one of said programs is based on a protocol defined by ITU-T recommendation V.42 bis.

12. A method as defined in claim 5 wherein one of said programs is based on MNP.

13. A method as defined in claim 5 wherein said first data compression and decompression algorithms are based on ITU-T recommendation V.42 bis.

14. A method as defined in claim 5 wherein said first compression and decompression algorithms are based on MNP.

* * * * *